A. LUTENEGGER.
VALVE FOR GAS LIGHTING SYSTEMS FOR AUTOMOBILES.
APPLICATION FILED DEC. 28, 1910.

1,040,712.  Patented Oct. 8, 1912.

Inventor
Albert Lutenegger,

Witnesses
J. H. Crawford.
V. B. Hillyard.

By Victor J. Evans
Attorney

UNITED STATES PATENT OFFICE.

ALBERT LUTENEGGER, OF SACRAMENTO, CALIFORNIA.

VALVE FOR GAS-LIGHTING SYSTEMS FOR AUTOMOBILES.

1,040,712. Specification of Letters Patent. Patented Oct. 8, 1912.

Application filed December 28, 1910. Serial No. 599,682.

*To all whom it may concern:*

Be it known that I, ALBERT LUTENEGGER, a citizen of the United States, residing at Sacramento, in the county of Sacramento and State of California, have invented new and useful Improvements in Valves for Gas-Lighting Systems for Automobiles, of which the following is a specification.

The present invention provides novel means whereby the gas lamps of a vehicle, such as an automobile, may be lighted at any time without requiring the machine to be stopped or the operator to dismount.

The invention contemplates a valve in a system whereby all the lamps of a machine have connection with the gas tank or other source of gas supply and whereby each of the burners is included in an electric circuit so that when the gas is turned on and the circuit closed the lamps will be lighted.

The invention consists of the novel features, details of construction and combinations of parts, which hereinafter will be more particularly set forth, illustrated in the accompanying drawing, and pointed out in the appended claims.

Figure 1:
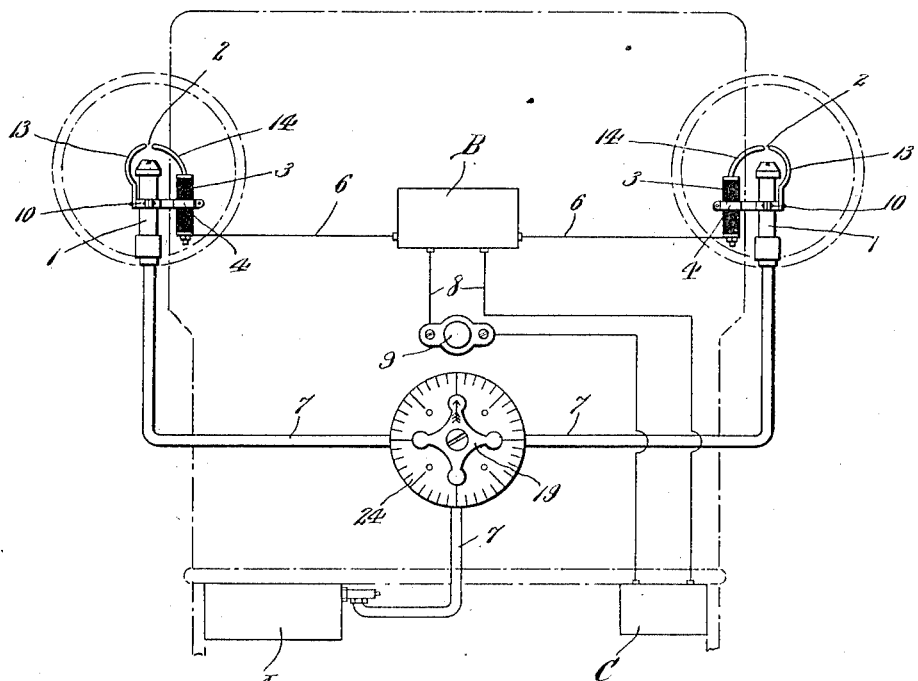
Figure 2:
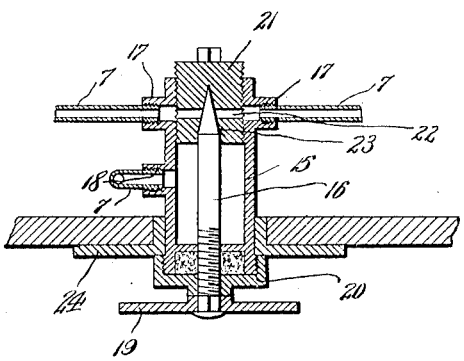

Referring to the drawing, forming a part of the application, Figure 1 is a detail view of a system embodying the invention. Fig. 2 is a sectional detail of the gas controlling valve.

Corresponding and like parts are referred to in the following description, and indicated in all the views of the drawing, by the same reference characters.

The numeral 1 designates a number of burners which are supplied with gas from a tank A, or other source of supply, by means of pipes or tubes 7.

The numeral 2 designates a spark gap between two electrodes 13 and 14, which are supported upon each burner by means of a clamp 4—10. A spark coil B is connected by means of wires 6 with the electrodes 14 which are electrically insulated at 3 from the burners. Wires 8 connect the spark coil with a battery C or other source of electric supply. A push button 9 is conveniently located in the circuit to admit of making and breaking the same to produce a spark at each of the gaps 2 so as to ignite the gas when the same is turned on.

The foregoing features, though essential to the lighting system, form no part of the invention, which relates to the valve as hereinafter more fully set forth.

The valve comprises a casing 15 and a stem 16, the latter being pointed at its inner end and having screwthread connection with the casing. The valve casing 15 has a series of coupling ends 17 and 18 for connection thereto of the several pipes. The coupling end 18 is the inlet and the pipe leading from the tank A is connected thereto. The coupling ends 17 correspond to the outlets and the pipes leading to the burners have connection therewith. The stem 16 is provided at its outer end with a hand wheel 19 and is threaded into the cap 20, which closes one end of the valve casing 15, said cap also constituting a stuffing box for confining the packing, whereby a tight joint is maintained between the stem 16 and valve casing 15. A plug 21 is threaded into the opposite end of the valve casing 15 and has a passage 22 which is in communication with the coupling ends 17, said passage intersecting with a passage 23 formed centrally within the plug 21 and forming a seat to receive the needle end of the stem 16. The plug 21 when removed admits of any obstructing matter being removed from the valve casing and also of having the passage 22 cleared of any matter tending to obstruct the same. A dial 24 supports the valve casing 15 and is provided upon its face with indicating matter, which in conjunction with the hand wheel 19 indicates the degree of opening of the valve. The dial 24 may be secured to the dash board or other convenient part of the machine and the push button or circuit closer 9 is located within convenient reach of the gas controlling valve, so that after the gas has been turned on the igniting circuit may be completed to produce a spark at each of the burners which will ignite the escaping gas, after which the valve may be turned to the required point indicated by the dial 24 so as to produce a light of given power.

From the foregoing description, taken in connection with the accompanying drawing, the advantages of the construction and of the method of operation will be readily apparent to those skilled in the art to which the invention appertains, and while I have described the principle of operation of the invention, together with the device which I now consider to be the embodiment thereof, I desire to have it understood that the device shown is merely illustrative, and that such changes may be made when desired as are within the scope of the claims appended hereto.

Having thus described the invention what is claimed as new, is:—

1. In a valve for a gas lighting system, the combination of a casing having openings in its sides, a plug removably fitted to an end of the casing and having a passage to register with certain openings in the sides of the casing, said plug being further provided with a second passage forming a valve seat which intersects the first mentioned passage, and a valve threaded into the opposite end of the casing and adapted to enter the said second passage and close the first mentioned passage.

2. In a valve for a gas lighting system, the combination of a casing having openings in its sides, a plug threaded into an end of the casing and closing the same, said plug having intersecting passages, the one adapted to register with the openings in the sides of the casing and the other passage forming a valve seat, a cap threaded upon the opposite end of the casing, and a valve having screwthread connection with the cap and adapted to close the second passage in the before mentioned plug.

3. In a valve for a gas lighting system, the combination of a dial, a casing supported by means of said dial and having an inlet opening and outlet openings in its sides, a plug threaded into an end of the casing for closing the same and having a passage to register with the outlet openings of the casing, said plug having a second passage intersecting the first mentioned passage and forming a valve seat, a cap fitted to the opposite end of the casing, a valve threaded in said cap and adapted to enter the second passage of the before mentioned plug, and a hand wheel fitted to the outer end of the valve and adapted to coöperate with the dial.

In testimony whereof I affix my signature in presence of two witnesses.

ALBERT LUTENEGGER.

Witnesses:
L. T. ALEN,
B. B. KEYES.

---

Copies of this patent may be obtained for five cents each, by addressing the "Commissioner of Patents, Washington, D. C."